R. THROCKMORTON.
AUTOMOBILE FENDER.
APPLICATION FILED MAR. 18, 1915.
1,157,460.
Patented Oct. 19, 1915.
2 SHEETS—SHEET 1.
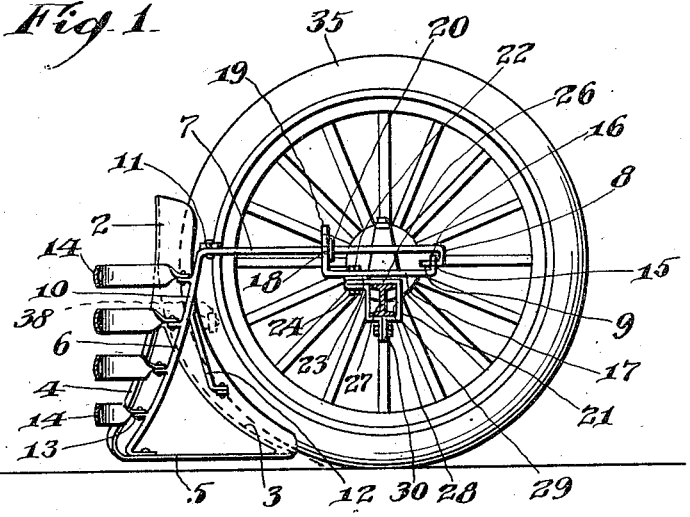
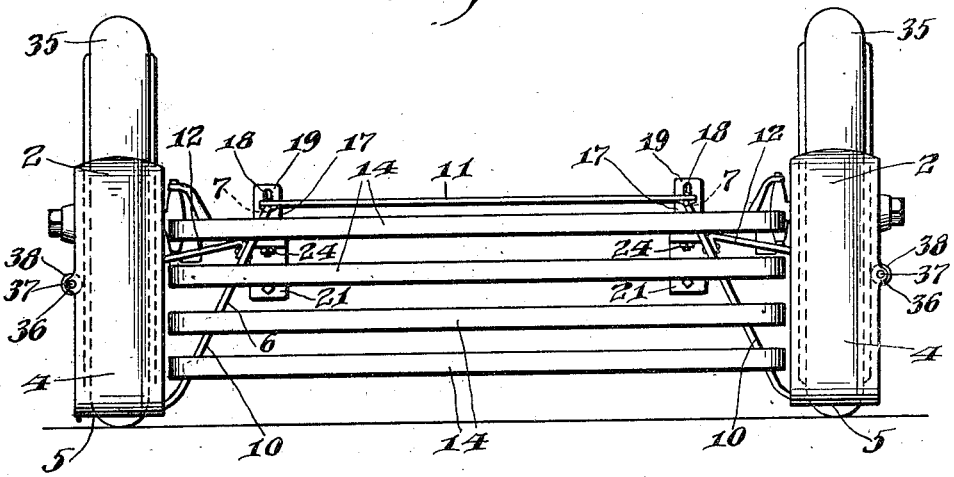

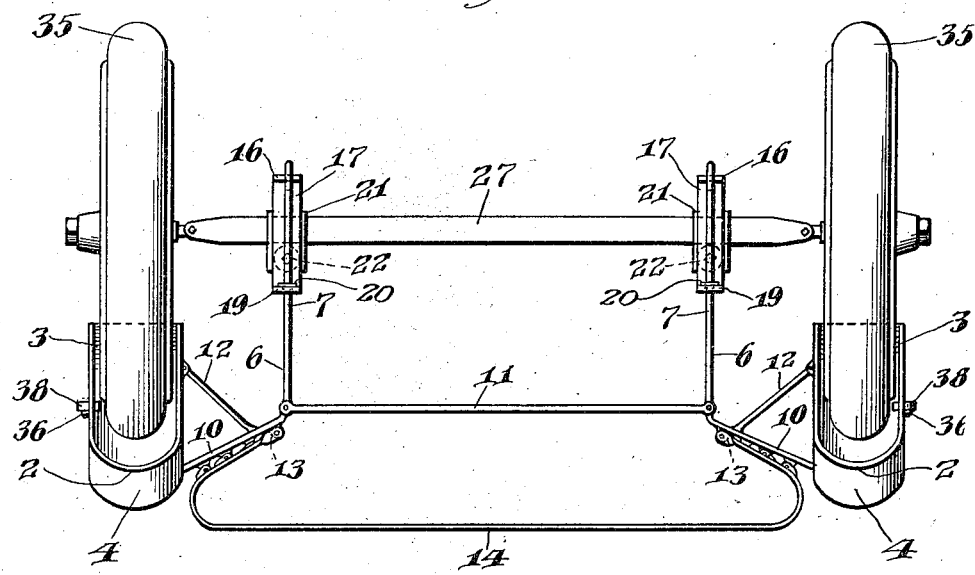
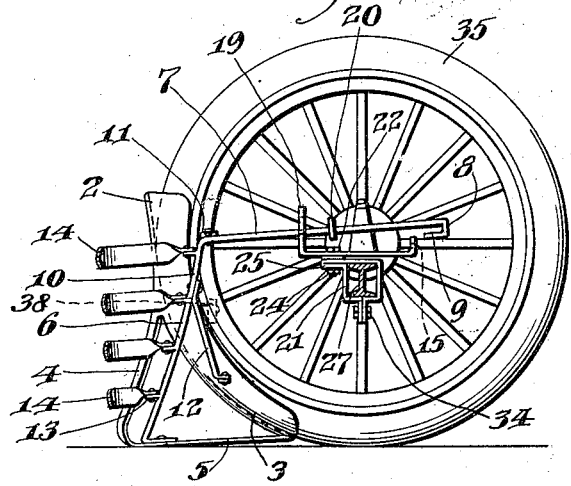
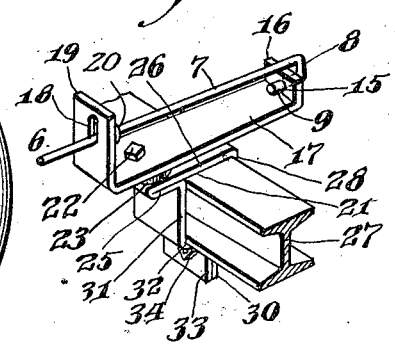

UNITED STATES PATENT OFFICE.

RAY THROCKMORTON, OF PHILADELPHIA, PENNSYLVANIA.

AUTOMOBILE-FENDER.

1,157,460.   Specification of Letters Patent.   Patented Oct. 19, 1915.

Application filed March 18, 1915. Serial No. 15,224.

*To all whom it may concern:*

Be it known that I, RAY THROCKMORTON, a citizen of the United States, residing at Philadelphia, in the county of Philadelphia and State of Pennsylvania, have invented new and useful Improvements in Automobile-Fenders, of which the following is a specification.

My invention relates to new and useful improvements in automobile fenders, and has for its object to provide a device of this character which may be supported from the stationary portion of the front axle having the wheel guard portions so suspended that they will follow the positions of the wheels when the latter are turned for steering.

A further object of the invention is to provide an automobile fender having wheel guards arranged to prevent a person or object from falling beneath the wheels, said guards having skids or runners adapted to contact with the road bed when a person or object is hit by the fender, said skids acting as brakes to impede the forward motion of the automobile.

A still further object of the invention is to provide an arrangement of parts for mounting the fender upon the vehicle, so that when said fender strikes an object or person, said fender will be unlocked or some of the parts disengaged from other of the parts to permit the fender to descend, so that the skids carried by the wheel guards will rest upon the ground.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1 is a vertical sectional view of my improved automobile fender showing it mounted upon the front axle of a vehicle. Fig. 2 is a front elevation thereof. Fig. 3 is a plan view thereof. Fig. 4 is a view similar to Fig. 1, showing the fender released and in its lowered position with the skids resting upon the ground; and Fig. 5 is a perspective view of the mounting device, whereby the fender is secured to the front axle and released when striking a person or object.

In carrying out my invention as here embodied 2 represent a pair of wheel guards each comprising a wheel-engaging or back portion 3 concavo-convex in cross section and forming lengthwise the arc of a circle corresponding approximately to the curvature of the wheel, a front portion 4 also concavo-convex in cross section and arcuate in shape, but curving inward from end to end or in a reverse direction to that of the wheel engaging portion, and a skid or runner 5 connecting the lower ends of the wheel engaging portion and the front portion, said skid being preferably formed integral with the other parts. To each of these guards is secured an attaching rod 6 comprising a body portion 7, the inner or rear end of which is bent downwardly, as at 8, and then bent forwardly parallel with the body as at 9 to produce a hook for a purpose to be hereinafter described, and a downwardly projecting front extension or portion 10, the end of which is attached to the skid portion of the wheel guard.

The pair of rods 6 which are used with the wheel guards are joined together or braced by a transverse rod 11, the ends of which are pivoted to the rods 6 adjacent the meeting point of the body and the downwardly extending portion. The device is further stiffened and strengthened by brackets 12, one of which is secured to the back portion of each of the guards, the opposite ends being attached to the downwardly projecting extensions or portions 10.

The downwardly projecting portions 10 are each provided with a number of projections 13, to which are pivoted the ends of the outwardly bowed springs 14 or lattice of the fender, which prevents a person or object from falling beneath the moving vehicle.

The rods 6, as before stated, are each provided with a hook formed from its inner end, and this hook registers with a hole 15 in the upwardly projecting extension 16 formed integral with the inner end of the swivel plate 17, the body of the rod passing through and being situated in the elongated slot or large opening 18 in the upwardly projecting front extension 19 formed integral with the forward end of the swivel plate 17, said opening 18 being of sufficient size to permit the body 7 of the rod 6 to freely move therein, and to prevent the withdrawal of the rod 6 from the swivel plate when the hook is displaced or released.

A collar 20, a washer or its equivalent may be carried by the rod 6 in such position as to cause it to lie between the upturned extensions or projections 16 and 19 of the swivel plate.

The swivel plate 17 is swiveled to a clamp 21 by means of a bolt 22 or its equivalent, said bolt passing through the swivel plate, a portion of the clamp, and a washer 23 situated between the swivel plate and the clamp, and a nut 24 is threaded on said bolt to prevent its displacement. The clamp 21 is preferably formed from a single piece of material bent upon itself as at 25 to form an extension of double thickness, through which passes the bolt 22, one portion of this material or metallic strip extending a sufficient distance as at 26 to accommodate the thickness of the axle 27, it then being bent at right angles to form a side 28 of sufficient length to accommodate the height of the axle, it then being bent at right angles to form one-half of the bottom wall 29, this then being bent again at right angles to form the extension 30. The other portion of the clamp material or metallic strip is bent at right angles intermediate the ends of the top wall 26 to form a side wall 31 similar to the side wall 28, and is then bent at right angles to form one-half of the bottom wall 32, and then bent again at right angles to form the extension 33 adapted to coöperate with the extension 30, both of said extensions being fastened together by a bolt or its equivalent 34, whereby said clamp is securely fastened upon the axle. In practice there are two of these clamps and swivel plates upon the axle, and in these swivel plates are mounted the ends of the rods 6, the downwardly projecting portions 10 of which carry the guards 2, said guards surrounding portions of the automobile wheels 35. As said wheels are operated from side to side during the steering of the vehicle, the guards 2 will be compelled to follow said wheels, moving the entire fender from side to side with relation to the vehicle through the medium of the swivel plates, and upon the fulcrums formed by the bolts 22, so that the entire front of the vehicle, regardless of its direction of travel, is covered at all times by the fender, thus preventing a person or object from ever passing beneath the wheels of the automobile.

In order to prevent the wheels or the tires carried thereby from coming directly in contact with the guards, I provide the rear portion 3 of the guards with a lug or projection 36, to which is secured a small shaft 37 having a roller 38 mounted thereon arranged to project inwardly beyond the inner face of the portion 3 of the guard, and engage the wheel or its tire, when the wheels are being turned for steering the vehicle, thereby eliminating a great amount of friction and preventing the wheel or tire from rubbing upon the portion 3 of the guards, so that the parts will not be unduly worn.

When the automobile is running under ordinary conditions, the fender will be in the position shown in Fig. 1, but should the fender come in contact with a person or object, said fender will be forced backward, causing the hook at the inner end of the rod 6 to be disengaged from the projection 16 on the swivel plate, thereby releasing the fender, permitting the same to descend to approximately the position shown in Fig. 4. When the fender has descended to this position, the skids 5 will be in contact with the road bed, producing an exceedingly effective brake and the tendency of the wheels will be to ride up the rear portion 3 of the guards, so that said wheels will be entirely lifted from the ground. As soon as the fender is released and descends, so that it comes in contact with the road bed, the tendency of the action of the wheels upon the guards is to draw said guards beneath the wheels, thereby causing the wheels to be raised from the ground as aforementioned. To reset the fender it is only necessary to raise the same until the ends of the hooks are in alinement with the holes 15, when the entire device may be drawn forward and the fender will then be in its normal position.

Of course I do not wish to be limited to the exact details of construction as herein shown, as these may be varied within the limits of the appended claims without departing from the spirit of my invention.

Having thus fully described my invention, what I claim as new and useful is—

1. A vehicle fender comprising a frame swiveled to the front axle of the vehicle, a pair of wheel guards carried by said frame and arranged to move from side to side therewith, each wheel guard comprising an arcuate rear portion concavo-convex in cross section arranged to partially cover the vehicle wheel, a lower portion or skid, and a forward arcuate portion bowed inward from end to end and concavo-convex in cross section, said forward and rear portions being connected at their upper ends, and a plurality of outwardly bowed springs pivoted to the frame and disposed between the wheel guards.

2. An automobile fender comprising a frame, wheel guards carried by said frame, outwardly bowed springs carried by said frame and disposed between the wheel guards, and means for mounting the frame upon the automobile axle, whereby the same may be moved from side to side with the wheels, and be released to permit the descent thereof when coming in contact with a person or object.

3. An automobile fender comprising a frame, means for mounting said frame upon the axle so that it can move from side to side and be released, wheel guards each comprising an arcuate rear portion concavo-convex in cross section, a lower portion or skid, and a forward arcuate portion bowed in the opposite direction to the rear portion, and concavo-convex in cross section, the upper end of said forward portion being connected with the upper end of the rear portion, and outwardly bowed springs carried by the frame and disposed between the wheel guards.

4. An automobile fender comprising a frame, wheel guards carried thereby arranged to partially inclose the wheels of an automobile and act as a brake when the frame is released, outwardly bowed springs carried by the frame and disposed between the wheel guards, hooks carried by the inner end of the frame, clamps secured to the automobile axle, and swivel plates pivoted upon the clamps and arranged to be engaged by a portion of the frame and the hooks for releasably mounting the fender.

In testimony whereof, I have hereunto affixed my signature in the presence of two subscribing witnesses.

RAY THROCKMORTON.

Witnesses:
 M. P. WILLIAMSON,
 MOLLIE TOBIAS.